US006332129B1

(12) United States Patent
Walker et al.

(10) Patent No.: US 6,332,129 B1
(45) Date of Patent: *Dec. 18, 2001

(54) METHOD AND SYSTEM FOR UTILIZING A PSYCHOGRAPHIC QUESTIONNAIRE IN A BUYER-DRIVEN COMMERCE SYSTEM

(75) Inventors: Jay S. Walker, Ridgefield; Daniel E. Tedesco, New Canaan; James A. Jorasch, Stamford, all of CT (US)

(73) Assignee: priceline.com Incorporated, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/205,663

(22) Filed: Dec. 4, 1998

Related U.S. Application Data

(63) Continuation-in-part of application No. 08/943,483, filed on Oct. 3, 1997, which is a continuation-in-part of application No. 08/923,683, filed on Sep. 4, 1997, which is a continuation-in-part of application No. 08/889,319, filed on Jul. 8, 1997, which is a continuation-in-part of application No. 08/707,660, filed on Sep. 4, 1996, now Pat. No. 5,794,207.

(51) Int. Cl.[7] .................................................. G06F 17/00
(52) U.S. Cl. .................................. 705/26; 705/5; 705/6; 705/10
(58) Field of Search ................................ 705/5, 6, 10, 26

(56) References Cited

U.S. PATENT DOCUMENTS 3,573,747 4/1971 Adams et al. .
3,581,072 5/1971 Nymeyer ................................. 705/37

(List continued on next page.)

FOREIGN PATENT DOCUMENTS

| 0 512 702 A2 | 11/1992 | (EP) . | |
|---|---|---|---|
| 360168265 | * 8/1985 | (JP) | ................................ G06F/15/26 |
| 403051985 | * 3/1991 | (JP) | ................................ G07B/1/00 |
| 403051986 | * 3/1991 | (JP) | ................................ G07B/1/00 |
| 403051987 | * 3/1991 | (JP) | ................................ G07B/1/00 |

(List continued on next page.)

OTHER PUBLICATIONS

Hensley, H.G., "I'll Take Jarez," *Travel Weekly*, vol. 45, p. 7, Feb. 1986.

Gibson, R., et al., "Marketing:Fast–Food Chains Hope Diners Swallow New 'Value' Menu of Higher–Priced Items," *The Wall Street Journal*, Mar. 13, 1992, p. B1.

(List continued on next page.)

*Primary Examiner*—James P. Trammell
*Assistant Examiner*—James W. Myhre
(74) *Attorney, Agent, or Firm*—Morgan & Finnegan LLP

(57) ABSTRACT

A system for processing the sale of goods and services includes a psychographic questionnaire to gather and assess buyers' needs and purchasing patterns. In a buyer-driven commerce system, the questionnaire is used to gather information based upon which the buyer offer, or conditional purchase offer, may be changed to increase the likelihood of acceptance of the conditional purchase offer. In one embodiment, the results of the gathered information are used to determine actions that may be applied to the offer before the offer is distributed to potential sellers. In another embodiment, the results of the gathered information are used to determine actions that may be applied to the offer after the offer has been rejected by sellers. Actions may include, but are not limited to, proposing counter-offers of changed prices, proposing counter-offers of package deals, and subsidizing buyer offers.

46 Claims, 11 Drawing Sheets

U.S. PATENT DOCUMENTS

| | | | | |
|---|---|---|---|---|
| 4,247,759 | | 1/1981 | Yuris et al. . | |
| 4,359,631 | * | 11/1982 | Lockwood et al. | 235/381 |
| 4,449,186 | | 5/1984 | Kelly et al. . | |
| 4,553,222 | | 11/1985 | Kurland et al. . | |
| 4,677,552 | | 6/1987 | Sibley, Jr. . | |
| 4,751,728 | | 6/1988 | Treat . | |
| 4,789,928 | | 12/1988 | Fujisaki . | |
| 4,799,156 | | 1/1989 | Shavit et al. . | |
| 4,845,625 | * | 7/1989 | Stannard | 705/5 |
| 4,862,357 | * | 8/1989 | Ahlstrom et al. | 705/6 |
| 4,903,201 | | 2/1990 | Wagner . | |
| 4,931,932 | | 6/1990 | Dalnekoff et al. | 705/5 |
| 4,958,284 | * | 9/1990 | Bishop et al. | 434/353 |
| 5,021,953 | | 6/1991 | Webber et al. | 705/6 |
| 5,023,435 | * | 6/1991 | Deniger | 235/375 |
| 5,041,972 | * | 8/1991 | Frost | 705/10 |
| 5,101,353 | | 3/1992 | Lupien et al. . | |
| 5,136,501 | | 8/1992 | Silverman et al. . | |
| 5,168,446 | | 12/1992 | Wiseman . | |
| 5,191,523 | | 3/1993 | Whitesage . | |
| 5,191,613 | | 3/1993 | Graziano et al. . | |
| 5,198,642 | * | 3/1993 | Deniger | 235/375 |
| 5,224,034 | | 6/1993 | Katz et al. . | |
| 5,237,499 | * | 8/1993 | Garback | 705/5 |
| 5,243,515 | | 9/1993 | Lee . | |
| 5,243,517 | * | 9/1993 | Schmidt et al. | 600/544 |
| 5,253,165 | | 10/1993 | Leiseca et al. | 705/5 |
| 5,262,941 | | 11/1993 | Saladin et al. . | |
| 5,283,731 | | 2/1994 | Lalonde et al. . | |
| 5,297,031 | | 3/1994 | Gutterman et al. . | |
| 5,329,589 | | 7/1994 | Fraser et al. . | |
| 5,331,546 | * | 7/1994 | Webber et al. | 705/6 |
| 5,353,219 | * | 10/1994 | Mueller et al. | 705/16 |
| 5,361,199 | | 11/1994 | Shoquist et al. . | |
| 5,404,291 | | 4/1995 | Kerr et al. . | |
| 5,420,914 | | 5/1995 | Blumhardt . | |
| 5,422,809 | * | 6/1995 | Griffin et al. | 705/5 |
| 5,426,281 | | 6/1995 | Abecassis . | |
| 5,444,630 | | 8/1995 | Dlugos . | |
| 5,467,269 | | 11/1995 | Flaten . | |
| 5,500,793 | | 3/1996 | Deming, Jr. et al. . | |
| 5,517,555 | | 5/1996 | Amadon et al. . | |
| 5,519,769 | | 5/1996 | Weinberger et al. . | |
| 5,553,131 | | 9/1996 | Minervino, Jr. et al. . | |
| 5,557,517 | | 9/1996 | Daughterty, III . | |
| 5,557,518 | | 9/1996 | Rosen . | |
| 5,570,283 | | 10/1996 | Shoolery et al. . | |
| 5,592,375 | | 1/1997 | Salmon et al. . | |
| 5,606,602 | | 2/1997 | Johnson et al. . | |
| 5,611,052 | | 3/1997 | Dykstra et al. . | |
| 5,615,269 | | 3/1997 | Micali . | |
| 5,640,390 | | 6/1997 | Sakamoto et al. . | |
| 5,664,115 | | 9/1997 | Fraser . | |
| 5,689,652 | | 11/1997 | Lupien et al. . | |
| 5,694,551 | | 12/1997 | Doyle et al. . | |
| 5,696,965 | | 12/1997 | Dedrick . | |
| 5,715,402 | | 2/1998 | Popolo | 705/37 |
| 5,717,989 | | 2/1998 | Tozzoli et al. . | |
| 5,732,398 | * | 3/1998 | Tagawa | 705/5 |
| 5,732,400 | | 3/1998 | Mandler et al. . | |
| 5,745,882 | | 4/1998 | Bixler et al. . | |
| 5,757,917 | | 5/1998 | Rose et al. | 705/79 |
| 5,758,328 | | 5/1998 | Giovannoli | 705/26 |
| 5,774,883 | | 6/1998 | Andersen et al. | 705/38 |
| 5,790,426 | * | 8/1998 | Robinson | 702/179 |
| 5,794,207 | | 8/1998 | Walker et al. | 705/1 |
| 5,794,219 | | 8/1998 | Brown | 705/37 |
| 5,797,127 | | 8/1998 | Walker et al. | 705/1 |
| 5,799,285 | | 8/1998 | Klingman | 705/26 |
| 5,809,478 | | 9/1998 | Greco et al. | 705/4 |
| 5,822,737 | | 10/1998 | Ogram . | |
| 5,826,244 | | 10/1998 | Huberman | 705/37 |
| 5,832,452 | | 11/1998 | Schneider et al. | 706/4 |
| 5,832,454 | * | 11/1998 | Jafri et al. | 705/6 |
| 5,835,896 | | 11/1998 | Fisher et al. | 705/37 |
| 5,845,265 | | 12/1998 | Woolston | 705/37 |
| 5,848,396 | * | 12/1998 | Gerace | 705/10 |
| 5,878,403 | | 3/1999 | DeFrancesco et al. | 705/38 |
| 6,018,715 | * | 1/2000 | Lynch et al. | 705/5 |

FOREIGN PATENT DOCUMENTS

| | | | | |
|---|---|---|---|---|
| 403164992 | * | 7/1991 | (JP) | G07B/1/00 |
| WO 85/02700 | * | 6/1985 | (WO) | G06F/15/21 |
| 96/34356 | | 10/1996 | (WO) | G06F/17/60 |
| 97/46961 | | 12/1997 | (WO) | G06F/17/60 |
| WO 98/10361 | * | 12/1998 | (WO) | G06F/17/60 |

OTHER PUBLICATIONS

Anonymous, "Another Reason to Love Those Afluent Customers," *Jewelers' Circular–Keystone,* vol. CLXX, No. 7, p. 64, Jul. 1999.

Koepper, Ken, "Room Inventory Auctioning: The Next CRS Generation", Lodging, Jan. 1990 at p. 26, 29–30.

Fishkin, Ken, Foresight Exchange Tutorial: (http://www.ideosphere.com/fx/docs/tutorial.html) Feb. 19, 1999 at p. 1–5.

"Bid.com 1998 Third–Quarter Revenue Increases 12.5 Percent From Second Quarter", Business Wire, Oct. 29, 1998.

Final Report: Virtual Hospital (http://www.telemed.medadmin.uiowa.edu/TRCDocs/Pubs/FinalReport/cVirtualH/virtualH/virtual h02.html), download date: Sep. 20, 1998.

"First Source Become a Member", More Reasons To Join First Source! (http://www.fsource.com/bene.html), download date: Sep. 20, 1998.

Jeffrey Davis, "Big Storm rising", Business 2.0, Sep., 1998 at p. 60.

Suite 101.com (http://www.suite101.com/doc.cfm.presskit/questions), 1998.

Web Marketing Today (http://www.wilsonweb.com/rfwilson/wmt2/issue36htm) dated Sep. 1, 1997, download date: Sep. 17, 1998.

"Free Stuff Internet Site Delivers for Viewers and Advertisers Alike", Press Release of PromoNet Interactive, Inc. dated Nov. 10, 1997.

About Iao, selected pages downloaded from www.iaoauction.com on Sep. 8, 1997 and Sep. 18, 1997.

Onsale: Auction Supersite, selected pages downloaded from www.onsale.com on Sep. 8, 1997.

Hapgood, Fred bidder Harvest, Sep. 1997, p. 58.

NASDAQ: What is NASDAQ?, selected pages downloaded from http://home.axford.com on Aug. 15, 1997.

NASDAQ Consolidated Subscriber Agreement, downloaded from www.pcquote.com/exchanges on Aug. 15, 1997.

TradingFloor: General Trading Information and Terms, downloaded from www.tradingfloor.com on Aug. 14, 1997.

HomeShark: Refinance Check, selected pages downloaded from www.homeshark.com on Aug. 13, 1997.

The Loan Process, downloaded from www.sdtech.com/mls/process on Aug. 7, 1997.

Trade–Direct: We Help You Trade With Confidence, selected pages downloaded from www.trade–direct.com on Aug. 6, 1997.

Classifieds2000: The Internet Classifieds, selected pages downloaded from www.classifieds2000.com on Aug. 6, 1997.

Internet Mortgage Service Eliminates Loan Agents and Passes Commissions on to the Consumer, Company Press Release, Yahoo Business Wire (Jun. 30, 1997).

Frequently Asked Questions About: Airhitch, selected pages downloaded from www.isicom.fr/airhitch on May 6, 1997.

Hitch a Flight to Europe, selected pages downloaded from www.travelassist.com on May 6, 1997.

Airhitch: Your Way to Low Cost Travel, selected pages downloaded from www.vaportrails.com on May 6, 1997.

Kelsey, J. and Schneier, B., Conditional Purchase Orders, 4th ACM Conference on Computer and Communications Security, ACM Press, 117–124 (Apr. 1997).

Bryant, Adam, "Shaking Up Air Fares' Status Quo", The New York Times, Mar. 31, 1997.

Silverman, Robert, "GM Drives Wed Ad Insertion Network", Inside Media, Feb. 26, 1997, vol. 9, No. 4, p. 1; ISSN:1046–5316.

"Flycast Introduces Unique 'Open Exchange' Match–Making Service", Interactive Marketing News, Feb. 21, 1997, vol. 4, No. 8.

"UK's World Telecom Unveils New WorldSaver Tariffs," Newsbytes, Information Access Company (Feb. 13, 1997).

"TransQuest and Web Ventures Deliver Internet Booking for Delta Air Lines", PR Newswire, Dec. 10, 1996, Financial News Section.

"Affinicast Enables Web Sites That Listen and Adapt to Customer Affinites", PR Newswire, Dec. 3, 1996.

"Web Ventures Presents BookIt!" press release printed from http://www/webventures.com/bookit/(Web Ventures World Wide Web site) on Dec. 2, 1996.

"World's First Real–time Travel Acution Service to Be Available Via World Wide Web. ETA To Open Bidding to Consumers," Business Wire, Dialog Trade & Industry Database (Nov. 4, 1996).

Gessel, Chris, "Trade Smarter: The Limit of Orders", Investor's Business Daily, Oct. 14, 1996, p. A1.

Crest: Cruise/Ferry Revenue Management System, selected pages downloaded from www.rtscorp.com on Aug. 5, 1996.

Nishimoto, Lisa, "Travel Services Are First Online Commerce Offerings to Fly," Infoworld, Jul. 29, 1996, downloaded from http://www.infoworld.com.

About Rate Hunter, dowloaded from http://207.49.64.77/rhprodrh.htm on Jul. 14, 1996.

Cathay Pacific Online Ticket Bidding, World Internet News Digest (May 8, 1996).

Sothbey's General Information, downloaded from www.sothebys.com (1996).

CyberBid, Net Fun Ltd.(1996).

Nimmer, Raymond, T., "Electronic Contracting; Legal Issues", 14 J. Marshall J. Computer & Info L.211, Winter, 1996.

American Law Institute, Draft–Uniform Commercial Code Revised Article 2 (Sales), parts 2, 3, and 7, pp. 1–15, Jan. 4, 1996.

Speidel, Richard E. & Schott, Lee A., "Impact of Electronic Contracting on Contract Formation Under Revised UCC Article 2, Sales", C878 ALI–ABA 335, Dec. 9, 1993.

Hainer, Cathy and Grossman, Cathy Lynn, "Where Vacationing Kids Get Good Care", USA Today, Apr. 1, 1992, at p. 4D.

Del Russo, Laura, "Ticket–Bidding Firm Closes Its Door," Travel Weekly, Mar. 12, 1992.

"Newsletters", The Atlanta Constitution, Mar. 1, 1992, p. K13.

"CRTL's Blue Ribbon Deals for 1992", Consumer Reports Travel Letter, Jan. 1992, vol. 8, No. 1, at pp. 3–5.

Traveler's Notes; Bookit Report, Consumer Reports Travel Letter, Dec. 1991 at p. 143.

Feldman, Joan M., "To Rein In Those CRSs; Computer Reservation Systems", Air Transport World, Dec. 1991, at p. 89.

"Money Briefs; Buy Low, Fly High", Gannet News Service, Nov. 20, 1991.

"Buy Low, Fly High", USA Today, Nov. 14, 1991 at p. 15.

Traveler's Notes; Easier Airfare Bidding, Consumer Reports Travel Letter, Oct. 1991 at p. 119.

Nelson, Janet "Practical Traveler; Airlines Relaxing Policy on No–Refund Tickets", The New York Times, Sep. 22, 1991 at p. 3 of Section 5.

Pelline, Jeff, "New Service; Now You Can Make a Bid on Your Next Airline Ticket Home", The Orange County Register, Sep. 1, 1991 at p. E01.

"Bookit Airfare Bidding System (Fax for Your Plane Ticket?)", Consumer Reports Travel Letter, Sep. 1991, pp. 97 & 106.

Upton, Kim "French Say Monoliths Off–limits to Visitors", Los Angeles Times, Aug. 25, 1991.

Pelline, Jeff, "Travelers Bidding on Airline Tickets; SF Firm Offers Chance for Cut–Rate Fares", San Francisco Chronicle, Section A4, Aug. 19, 1991.

Carey, Christopher, "Firm Offers Auction For Airline Tickets", St. Louis Post–Dispatch, Aug. 7, 1991 at p. 1B.

Del Rosso, Laura, "Marketel Says It Plans to Launch Air Fare 'Auction' in June", Travel Weekly, Apr. 29, 1991.

NASDAQ Adds Enhancements to SOES Limit Order File, Securities Week, Nov. 26, 1990, p. 5.

Ritter, Jeffrey B., "Scope of the Uniform Commercial Code: Computer Contracting Cases and Electrical Commercial Practices", 45 Bus. Law 2533, Aug., 1990.

Greenburg, Peter, S., "Judging DeRegulation", The Record, Jul. 22, 1990 at p. T01.

Greenburg, Peter, S., "The Savvy Traveler: Lower Air Fares for Consumers Not in the Cards; Airlines; Remember When It Costs $16 to fly From Los Angeles to San Francisco? Then You Remember the Days Before DeRegulation. Since Then, Prices Have Soared", Los Angeles Times, Jul. 8, 1990 at p. L2.

Wallace, David, "Company Planning to Let Fliers Bid on Airfares", Philadelphia Business Journal, Mar. 26, 1990 at p. 15.

"Letter to Business Extra", The San Francisco Chronicle, Dec. 26, 1989 at p. C7.

Schrage, Michael, "An Experiment in Economic Theory; Labs Testing Real Markets", The Record Section B1, Nov. 26, 1989.

Schrage, Michael Innovation/Michael Schrage: Laboratory Experiments with Market Economics, Los Angeles Times, Nov. 23, 1989 at p. D1.

Golden, Fran "AAL's Riga Doubts Marketel's Appeal to Retailers", Travel Weekly, Nov. 13, 1989.

Del Rosso, Laura, Firm Proposes ticket–bidding system; Marketel explores electronic auction of travel; Marketel International., Travel Weekly Section No. 91, vol. 48, p. 1; Nov. 13, 1989.

Carlsen, Clifford, "Polaris Group Set to Fly the Leveraged Sky", San Francisco Business Times, Nov. 6, 1989 at p. 1.

Kuttner, Robert, "Computers May Turn the World into One Big Commodities Pit", Business Week, Sep. 11, 1989.

Carlsen, Clifford, "From Airline Tickets to Human Organs, the Electronic Markets Are Booming", San Francisco Business Times, Aug. 14, 1989 at p. 17.

"Public May Submit Bids To Get Bargain Rates", Wall Street Journal, Section 2; p. 1, Column 1; Aug. 1, 1989.

American Airlines Internet Silent Auction, selected pages downloaded from www.americanair.com.

Apollo Host Computer, selected pages downloaded from www.appollo.com.

"Auctioning unsold airline tickets." (http://www.newciv.org/GIB/BOV/BV–409.HTMl), at p. 1.

Cathay Pacific:CyberTraveler Auction #3—Official Rules, selected pages downloaded from www.cathaypacific.com.

CSM Online: About Collector'Super Mall downloaded from www.csmonline.com.

Sabre Decision Technologies, selected pages downloaded from www.sabre.com.

PhoneMiser: Frequently Asked Quesitons, downloaded from www.phonemiser.com.

The United Computer Exchange How It All Works, selected pages downloaded from www.uce.com.

Tired of Shopping For the Best Home Loan?, Mortgage Loan Specialists.

LANCORP Mortgage Services, http://www.lancorp–mortgage.com/retailpa.htm, 1998.

Inland Mortgage Corporation, http://inlandmortgage.com/index.htm, 1998.

The Mortgage Store, http://www.mortgagestore.com, 1998.

Golden Age Antiques and Collectibles Online Auction, http://www.goldage.com, 1997.

Moran, Susan, "Xerox Won't Duplicate Past Errors", Business Week, Sep. 29, 1997.

Coleman, Zach, "Electronic Trading System Matches Buyers, Seller", Atlanta Business Chronicle, vol. 20; No. 12; p. 37A, Aug. 22, 1997.

"What's Holding Up E–Cash?", Cybernautics Digest, vol. 3; no. 7, Finance.

Resnick, Paul et al, "Roles For Electronic Brokers", http://ccs.mit.edu/CCSWP179.htm 1997.

Philatelists Online Information, http://www506.bonsai.com/q/@131354lhyljf/infop.html, 1997.

Sports trade Information, http://www.sportstrade.com/infos.html, 1997.

Numismatists Online Information, http://www.numismatists.com/info.html, 1997.

Sell and Trade Internet Marketplace, Sell and Trade, http://sellandtrade.com/script/main.asp, 1997.

Kay, Alan, "Chapter 7 Future Research", 1997.

Trade–direct, http://www.trade–direct.com. 1997.

"Internet Mortgage Service Eliminates Loan Agents and Passes Commissions on to the Consumer", Yahoo! Finance, 1997.

Negroponte, Nicholas, "Pay Whom Per What When, Part 2", Negroponte, Issue 5.03, 1997.

"Ticketing revolution Could Triple Airline Profits, Analysts Says", Aviation Daily, vol. 325; No. 11:p. 87, 1996.

"Auctioning Unsold Airline Tickets", adapted extract from Insight (USA), The Global Ideas Bank, 1996.

Rockoff, Todd E., et al., "Design of an Internet–based system for remote Dutch auctions," Internet Research: Electronic Networking Applications and Policy, vol. 5, No. 4, pp. 10–16, 1995.

Franklin, Matthew K., et al., "The Design and Implementation of a Secure Auction Service," Proceedings: 1995 IEEE Symposium on Security and Privacy, pp. 2–14, 1995.

Tenebaum, Jay M., et al., "CommerceNet: Spontaneous Electronic Commerce on the Internet," 1995 IEEE Spring Conference, pp. 38–43.

Sirbu, Marvin and Tygar, J.D., "NetBill: An Internet Commerce System Optimized for Network Delivered Services," IEEE 1995 Spring Conference, pp. 20–25.

Bunker, Ted, "How Auction Technology Sped And Enhanced Sale Of Radio Licenses," Investor's Business Daily, Executive Updated, Regulation, p. A3, Feb. 24, 1995.

"AUCNET: The Story Continues", Harvard Business School, Jan. 17, 1995.

Anand, R., and Rao, M. Padmaja, "The Electronic Flea Market", IBM Research Division: Research Report, pp. 1–18, Jul. 28, 1994.

"Unusual Farmland Auction Set," Harrison Scott Publications. Liquidation Alert, Mar. 28, 1994.

"The Computer Museum brings auction block to cyberspace in First Internet Auction," Business Wire, Mar. 14, 1994.

Freeman, Brian and Gideon, Lidor, "Hosting Services—Linking the Information Warehouse To the Information Consumer," IEEE 1994 Spring Conference, pp. 165–171.

Booker, Ellis, "Mega real estate auction counts on imaging," Computerworld, p. 20, Dec. 7, 1992.

Abstract: "A forward/reverse auction algorithm for asymmetric assignment problems," Computational Optimization and Applications, Dec. 1992.

Abstract: "Marketel Shuts Doors," Travel Agent Magazine, Mar. 23, 1992.

Cass, Maxine, "West Coast Agents Remain Skeptical About New Air Ticket Sales Plan; Marketel: Airline ticket sales system sparks concern," Travel Agent Magazine, p. 50, Sep. 2, 1991.

Bookit!, "Airline Ticket Purchase Order For Business & Leisure Travel", Marketel International, Inc., 1991.

Inhaber, Herbert, "How To Solve the Problem of Siting Nuclear Waste," Transactions of the American Nuclear Society, vol. 62, Nov. 11–15, 1990.

Dyson, Esther, "Information, Bid and Asked," Forbes, Aug. 20, 1990.

"Mercado electronico, El chance de regatear por computador", CIENCIA Technologia E Informatica, Mar. 21, 1990 (Translation enclosed).

Cole, Jeff, "Fare bidding plan could be the ticket", St. Paul Pioneer Press Dispatch, Mar. 11, 1990.

Miller, Ross M., "The Design of Decentralized Auction Mechanisms that Coordinate Continuous Trade in Synthetic Securities," Journal of Economic Dynamics and Control, pp. 237–253, 1990.

"Business Briefing, Airline Seats May Go on the Auction Block", Insight on the news, Dec. 4, 1989.

"Business Travel Update, Automation", Travel Weekly, Nov. 27, 1989.

Munro, Don and McCann, David, "A New Way To Purchase Travel, Automated Service Would Let Companies Bid For Already–Filled Airline Seats", Business Travel News, Nov. 6, 1989.

"An Electronic Auction Ahead For Airline CRS's?", The Business Week Newsletter for Information Executives, Oct. 27, 1989.

Cohen, Danny, "Electronic Commerce," ISI Research Report, University of Southern California, Oct. 1989.

"From Airline Tickets to Human organs, the Electronic Markets are Booming", Times, vol. 3, No. 50, Aug. 14, 1989.

Coyne, Andrew, "Unbundling ideas may alter world of politics," The Financial Post (Toronto), Section 1, p. 11, Sep. 27, 1989.

Malone, Thomas W., et al., "Electronic Markets and Electronic Hierarchies," Communications of the ACM, vol. 30, No. 6, Jun. 1987.

"AUCNET: TV Auction Network System," Harvard Business School, Jul. 19, 1989.

Sammer, Harald W., "Online Stock Trading Systems; Study of an Application," IEEE 1987 Spring Conference, pp. 161–162.

Littlefair, T., "Homelink: a unique service," Computer Bulletin, pp. 12–14, Jun. 1986.

Banatre, Jean–Pierre, et al., "The Design and Building of Echere, a Distributed Electronic Marketing System," Communications of ACM, vol. 29, No. 1, Jan. 1986.

Turoff, Murray and Chinai, Sanjit, "An Electronic Information Marketplace," Elsevier Science Publishers B.V., pp. 79–90, 1985.

Banatre, Michel, "Distributed auction bidding system," IPC Business Press, Computer Communications, vol. 4, No. 4, Aug. 1981.

* cited by examiner

| RULE NUMBER 720 | SELLER IDENTIFIER 730 | ORIGINAL CPO CONDITIONS 740 | RULE 750 | ADDITIONAL TERMS AND CONDITIONS 760 | ACTION 770 |
|---|---|---|---|---|---|
| 5555 | S81818 | ROUND TRIP AIR TRAVEL TO NEW YORK | RETURN AT LEAST 7 DAYS AFTER ARRIVAL | STAY AT SHERATON FOR AT LEAST 5 NIGHTS | PROVIDE OFFER TO BUYER, SUBSIDIZE CPO WITH UP TO $100 FROM SELLER'S ACCOUNT, ALLOCATE IN $25 AMOUNTS EVERY 2 DAYS UNTIL ACCEPTANCE |
| 6587 | S47474 | ROUND TRIP AIR TRAVEL TO LOS ANGELES | RETURN AT LEAST 5 DAYS AFTER ARRIVAL | STAY AT HILTON FOR AT LEAST 3 NIGHTS | PRESENT SELLERS OF ORIGINALLY REQUESTED PRODUCT WITH PACKAGE CPO COUNTER-OFFER PROPOSAL TO INCLUDE TERMS AND CONDITIONS AND $275 PRICE |
| 4572 | S47474 | WEEKEND CAR RENTAL, NEW YORK CITY | OFFER MUST BE FOR AT LEAST $200 | N/A | ACCEPT CPO |

FIG. 3

| QUESTION 630 | ANSWER CHOICE 635 | ACTION 640 |
|---|---|---|
| ARE YOU A FREQUENT TRAVELER WHO FLIES MORE THAN 5 TIMES A YEAR? | (A) YES | IF REJECTED, COUNTER-OFFER (OFFERED PRICE) + (20% OF OFFERED PRICE) |
| DO YOU HAVE LODGING ACCOMMODATIONS PLANNED FOR YOUR TRIP? | (B) NO | IF REJECTED, PERFORM HOTEL/AIRLINE TICKET PACKAGE COUNTER-OFFER |
| IF WE ARE UNABLE TO FIND YOU TICKETS AT YOUR PRICE FOR THIS TRIP, WHAT WILL YOU DO? | (C) BUY TICKETS DIRECTLY FROM A MAJOR AIRLINE | SUBSIDIZE OFFER |
| IF WE ARE UNABLE TO FIND YOU TICKETS AT YOUR PRICE FOR THIS TRIP, WHAT WILL YOU DO? | (D) BUY FROM AN ON-LINE TRAVEL SERVICE | PERFORM REASONABLENESS TEST, INSTANT ACCEPTANCE IF REASONABLE |
| DO YOU NEED HOTEL ACCOMMODATIONS FOR YOUR STAY IN YOUR DESTINATION CITY? | (A) YES | PERFORM HOTEL/AIRLINE TICKET PACKAGE COUNTER-OFFER |

QUESTIONNAIRE

1.) ARE YOU A FREQUENT TRAVELER WHO FLIES MORE THAN 5 TIMES A YEAR?

(A) YES ☐

(B) NO ☐

2.) DO YOU HAVE LODGING ACCOMMODATIONS PLANNED FOR YOUR TRIP?

(A) YES ☐

(B) NO ☐

3.) IF WE ARE UNABLE TO FIND YOU TICKETS AT YOUR PRICE FOR THIS TRIP, WHAT WILL YOU DO?

(A) DRIVE ☐    (C) BUY TICKETS DIRECTLY FROM A MAJOR AIRLINE ☐

(B) NOT GO ☐    (D) BUY TICKETS FROM AN ON-LINE TRAVEL SERVICE ☐

4.) DO YOU NEED HOTEL ACCOMMODATIONS FOR YOUR STAY IN YOUR DESTINATION CITY?

(A) YES ☐

METHOD AND SYSTEM FOR UTILIZING A PSYCHOGRAPHIC QUESTIONNAIRE IN A BUYER-DRIVEN COMMERCE SYSTEM

CROSS-REFERENCE TO RELATED APPLICATIONS

This application is a continuation-in-part of U.S. patent application Ser. No. 08/943,483, filed Oct. 3, 1997, which is continuation-in-part of U.S. patent application Ser. No. 08/923,683, filed Sep. 4, 1997, which is a continuation-in-part of U.S. patent application Ser. No. 08/889,319, filed Jul. 8, 1997, which is a continuation-in-part of U.S. patent application Ser. No. 08/707,660 filed Sep. 4, 1996 U.S. Pat. No. 5,794,207, issued Aug. 11, 1998, each of which is incorporated herein by reference in its entirety.

FIELD OF THE INVENTION

The present invention relates generally to a system for processing the sale of goods and services and, more particularly, to a system and method for utilizing a psychographic questionnaire to efficiently increase the rate of sales in a buyer-driven commerce system based on an assessment of a potential buyer's needs and purchasing patterns.

BACKGROUND OF THE INVENTION

Most systems for processing the sale of products are seller-driven, whereby the seller prices, packages, configures and offers the product for sale, and the buyer decides whether or not to accept the seller's offer. In a buyer-driven system, however, the buyer dictates the terms of the offer and one or more sellers decide whether or not to accept the offer. A "help wanted" advertisement, for example, is a buyer-driven inquiry since the employer is looking to locate and buy the services of a qualified employee. The inquiry is advertised to a large number of potential employees, who may respond by submitting their resumes to the prospective employer.

Priceline.com, Incorporated of Stamford, CT is a merchant that has successfully implemented a buyer-driven system for the sale of products such as airline tickets and automobiles. Priceline.com utilizes a Conditional Purchase Offer (CPO) Management System, described in U.S. Pat. No. 5,794,207 and International Application Number PCT/US97/15492, that processes Conditional Purchase Offers and/or Binding Conditional Purchase Offers (Binding CPOs) received from individual consumers. These CPOs contain one or more buyer-defined conditions for the purchase of goods or services, at a buyer-defined price. The Binding CPOs are typically guaranteed by a General Purpose Account, such as a debit or credit account, and thereby provide sellers with a mechanism for enforcing any agreement that may be reached with the consumer. The CPOs are provided by the CPO Management System to sellers, either directly or using seller-supplied rules, for individual sellers to either accept or reject. If a seller accepts a Binding CPO, the CPO Management System binds the buyer on behalf of the accepting seller, to form a legally binding contract.

Thus, the CPO Management System empowers individual consumers to obtain goods and services at a price set by the consumer. The CPO Management System provides numerous commercial advantages to sellers as well. For example, the CPO Management System permits individual sellers to effectively sell excess capacity when actual demand fails to meet forecasted demand. In particular, the CPO Management System provides an effective mechanism for sellers to be confident that if they accept a consumer's offer, the consumer will purchase the requested goods or services at the agreed-upon price, and not just use the information to ascertain the seller's underlying level of price flexibility, which, if known to a seller's competitors or customers, could dramatically impact the seller's overall revenue structure.

One of the major advantages of the CPO Management System as it applies to, e.g., the purchase of airline tickets through priceline.com, is its ability to tap into the market of "below-the-fare-line" consumers. This is a group of consumers who will not pay a published fare and will thus base their decisions to travel solely upon their offers being accepted. However, oftentimes these consumers' offers are found to be unacceptable and are subsequently rejected by the airlines. In an effort to make sales to these consumers, customer service representatives ("CSRs") at priceline.com may contact them and propose counter-offers, sometimes including supplemental products (e.g., "We can't sell you tickets for your offered price of $300, but we can sell you tickets and a hotel room for the total price of $500"). Unfortunately, this method of counter-offering is expensive and potentially cost-ineffective because counter-offer decisions cannot be made efficiently. Because the CPO Management System has only limited information available on which to base its counter-offer decisions (i.e., the CPO conditions), it is difficult to determine which consumers are likely to accept counter-offers and on what specific terms. Thus, there exists a need to leverage the asset-value inherent in rejected offers by efficiently making counter-offer decisions.

Another method used to make low offers acceptable is to create "package counter-offers" before consumers' offers are presented to and subsequently rejected by the sellers. Here, consumers are required to purchase product(s) in addition to their originally sought-after products for an adjusted total price. When an additional product is introduced, a package counter-offer is created comprising the original product and the additional product for a single proposed price, thus combining the individual prices of each of the underlying products. In determining the single proposed price, the CPO Management System blends the additional product's price in order to make the original offer acceptable. For example, if a consumer submits an offer to purchase airline tickets for $100 and the CPO Management System determines that the consumer's offer is too low but would be acceptable for $125, a package counter-offer is created with an additional product, such as a rental car. If the rental car can be purchased from a seller for $75, the CPO Management System transmits the package counter-offer including the airline tickets and the rental car to the consumer for a package price of $200.

Although the package counter-offer method is effective for increasing sales by decreasing seller rejections, a shortcoming is that there is no way for the CPO Management System to determine which additional product(s) are appropriate to offer as complimentary products for each particular consumer. For example, if a consumer submits an offer for airline tickets, priceline.com knows that hotel rooms and rental cars are typically appropriate products to include in a package counter-offer. But if that consumer has already booked hotel accommodations but needs a rental car, a counter-offer opportunity is wasted if the CPO Management System redundantly counter-offers the consumer a package including a hotel room instead of a rental car. Thus, there exists a need to leverage counter-offer opportunities by counter-offering individual consumers with additional product(s) that they actually need and are therefore more likely to accept as part of a package counter-offer.

Another method utilized to make low consumers' offers acceptable before the offers are rejected is to subsidize the offers. For example, if a consumer's offer of $100 for an airline ticket through the priceline.com system is low in comparison to the available fare of $125, the CPO Management System will make such a determination and apply a subsidy amount of $25 to the offer to make it more likely to be accepted by a seller. However, while this method is effective to sell low-demand, perishable inventory to below-the-fare-line consumers, there is no way for the CPO Management System to allocate its finite subsidy budget in a cost-effective manner. For example, it would be better for the CPO Management System to subsidize offers from consumers who will purchase tickets from a competing air travel service if their offers get rejected because priceline.com will gain market share by diverting sales from competitors. On the other hand, there is no market share advantage by subsidizing offers from consumers who are not likely to purchase tickets from a competitor. Therefore, a need exists to increase the acceptance rate of consumer offers while simultaneously managing a finite subsidy budget in a cost-effective manner.

SUMMARY OF THE INVENTION

In accordance with one aspect of the invention, there is provided a system and a method for processing a sale of an item, the system comprising the steps of: obtaining a first conditional purchase offer for the item from a customer, the first conditional purchase offer containing at least a description of the item, a payment identifier for specifying a manner in which funds may be paid and a price; providing a questionnaire having a first question and a first and a second answer to the customer; receiving one of the first and second answers from the customer; performing a predetermined action based upon said received answer; and generating a second conditional purchase offer including at least the item based on the predetermined action.

In accordance with another aspect of the invention, there is provided a system and a method for processing a sale of an item, the method comprising the steps of: obtaining a first conditional purchase offer for the item from a customer, the first conditional purchase offer containing at least a description of the item, a payment identifier for specifying a manner in which funds may be paid and a price; providing a questionnaire having a first question and a first and a second answer to the customer; receiving one of the first and second answers from the customer; providing the first conditional purchase offer to a plurality of potential sellers; determining whether one or more of the sellers have accepted the first conditional purchase offer, and if one or more sellers have not accepted the first conditional purchase offer: performing a predetermined action based upon the received answer; and generating a second conditional purchase offer including at least the item based on the predetermined action.

BRIEF DESCRIPTION OF THE DRAWINGS

FIG. 3 is a schematic view of the exemplary seller rules database of FIG. 2;

FIG. 4 is a schematic view of the exemplary questionnaire database of FIG. 2;

FIG. 5 is a schematic view of a questionnaire in accordance with the present invention;

DETAILED DESCRIPTION

Generally, a conditional purchase offer (CPO) management system 100 is disclosed for administering a psychographic questionnaire 1200 (FIG. 5) to a potential buyer during or after the buyer's submission of a CPO. Based on the buyer's answers to the questionnaire 1200, the CPO Management System 100 assesses the buyer's needs and purchasing patterns for the purpose of altering the processing of the CPO.

Figure 1:
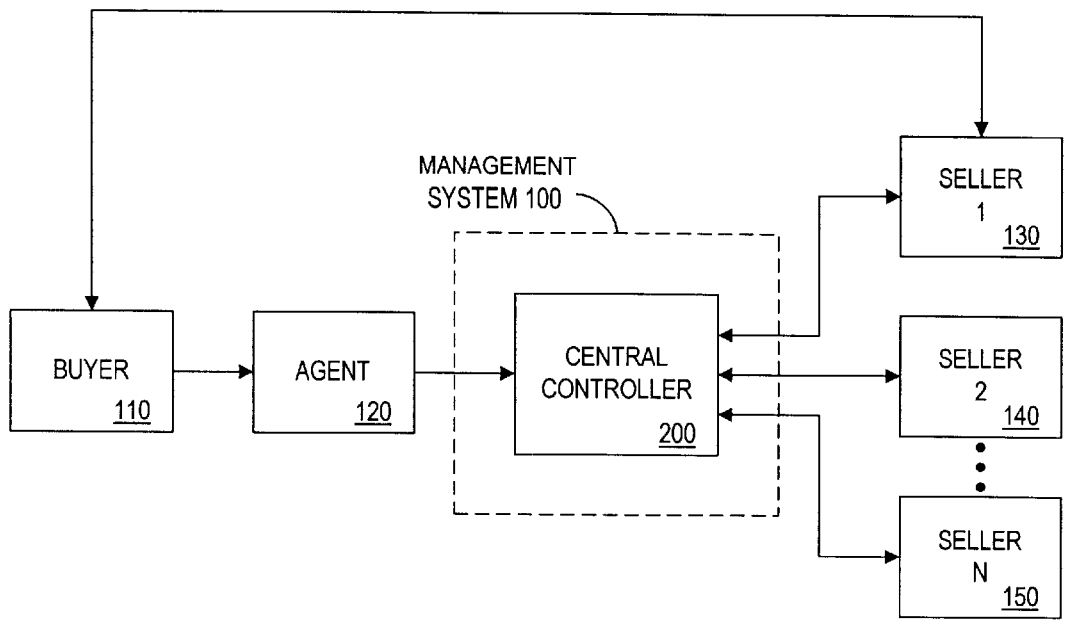
FIG. 1 is a schematic block diagram illustrating a CPO Management System in accordance with the present invention.

FIG. 1 shows the CPO Management System 100 for receiving and processing CPOs for one or more goods or services, from one or more buyers 110 or agents 120 (on behalf of buyers 110). The CPO Management System 100 determines whether one or more sellers, such as sellers 130, 140, 150 are willing to accept a given CPO. As discussed further below, if a seller accepts a given CPO, the CPO Management System 100 binds the buyer on behalf of the accepting seller, to form a legally binding contract.

As used herein, the following terms are defined to mean:

Agency-Based Seller—A seller who has delegated authority to the CPO Management System to accept or reject a given CPO using seller-defined CPO Rules.

Broadcast-Based Seller—A seller who has received a CPO from the CPO Management System (directly or by, for example, access to an electronic posting) for evaluation.

Conditional Purchase Offer (CPO)—An offer containing one or more conditions submitted by a buyer for the purchase of goods and/or services at a buyer-defined price.

Binding Conditional Purchase Offer (Binding CPO)—A binding offer containing one or more conditions submitted by a buyer for the purchase of goods and/or services at a buyer-defined price. As compared to a CPO, a Binding CPO includes a payment guarantee, for example with a General Purpose Account, and authorization to debit the Account upon acceptance of the Binding CPO.

Conditional Purchase Offer (CPO) Rule—A restriction defined by an Agency-Based Seller under which the operator of the CPO Management System may act as an agent to determine whether to fill a CPO for that Agency-Based Seller.

CPO Management System—A controller that receives and processes CPOs for one or more goods or services, from one or more buyers, to determine if one or more sellers (Agency-Based or Broadcast-Based Sellers) are willing to accept a CPO.

General Purpose Account—Any account from which payment can be made, including a credit or debit account.

As shown in FIG. 1, the CPO Management System 100 preferably includes a central controller 200, discussed further below in conjunction with FIG. 2. The CPO Management System 100 may provide a given CPO to selected sellers 130, 140, 150 based on predefined screening criteria, so that sellers only obtain CPOs that they may be interested in or are authorized to screen. Alternatively, the CPO Management System 100 may provide all CPOs to all sellers for screening.

As discussed further below, each buyer 110 contacts the CPO Management System 100, for example, by means of telephone, facsimile, online access (i.e. the Internet), electronic mail, in-person contact or through an agent, and provides the CPO Management System 100 with the terms of the buyer's CPO. It is noted that each buyer 110 and seller 130, 140, 150 may employ a general-purpose computer for communicating with the CPO Management System 100. The general-purpose computer is preferably comprised of a processing unit, a modem, memory means and any software required to communicate with the CPO Management System 100.

The CPO Management System 100, as well as any general-purpose computers utilized by buyers 110 or sellers 130, 140 (collectively, the "nodes") preferably transmit digitally encoded data and other information between one another. The communication links between the nodes preferably comprise a cable, fiber or wireless link on which electronic signals can propagate.

Agency and Broadcast-Based Sellers

According to one feature of the present invention, the CPO Management System 100 preferably provides an optional agency feature that permits the CPO Management System 100 to accept or reject a given CPO on behalf of certain agency-based sellers 130 who have delegated such authority to the CPO Management System 100. Thus, the CPO Management System 100 preferably (i) evaluates CPOs on behalf of certain agency-based sellers 130 who have delegated authority to the CPO Management System 100 to accept or reject a given CPO, and (ii) permits broadcast-based sellers, such as sellers 140, 150 to evaluate CPOs independently.

Thus, the CPO Management System 100 can preferably provide one or more CPOs to each broadcast-based seller 140, 150, for the seller 140, 150 to independently determine whether or not to accept a given CPO. It is noted that the CPO Management System 100 can provide a CPO to each appropriate broadcast-based seller 140, 150, for example, by means of a broadcast transmission, or by means of posting the CPO, for example, on an electronic bulletin board accessible by each broadcast-based seller 140, 150. Alternatively, the CPO Management System 100 can evaluate one or more CPOs against a number of CPO rules defined by one or more agency-based sellers 130, to decide on behalf of an agency-based seller 130 to accept or reject a given CPO. An illustrative set of CPO rules for one illustrative agency-based seller 130 is set forth in FIG. 3, discussed in more detail below. Thus, the CPO Management System 100 can determine if one or more sellers 140, 150 accepts a given CPO by providing the CPO to each seller 140, 150 and receiving an acceptance or rejection, or by applying the CPO to the CPO rules to render a decision to either accept, reject or counter a CPO on behalf of a particular seller 130.

As discussed further below, a CPO rule is a set of restrictions defined by a given agency-based seller 130 for which the seller 130 is willing to accept a CPO. For a more detailed discussion of CPO rules, the manner in which they are generated, and related security issues, see U.S. patent application Ser. No. 08/889,319, entitled "Conditional Purchase Offer Management System," referenced above, and International Patent Application PCT/US97/15492, entitled "Conditional Purchase Offer Management Systems," incorporated by reference herein.

Figure 2:
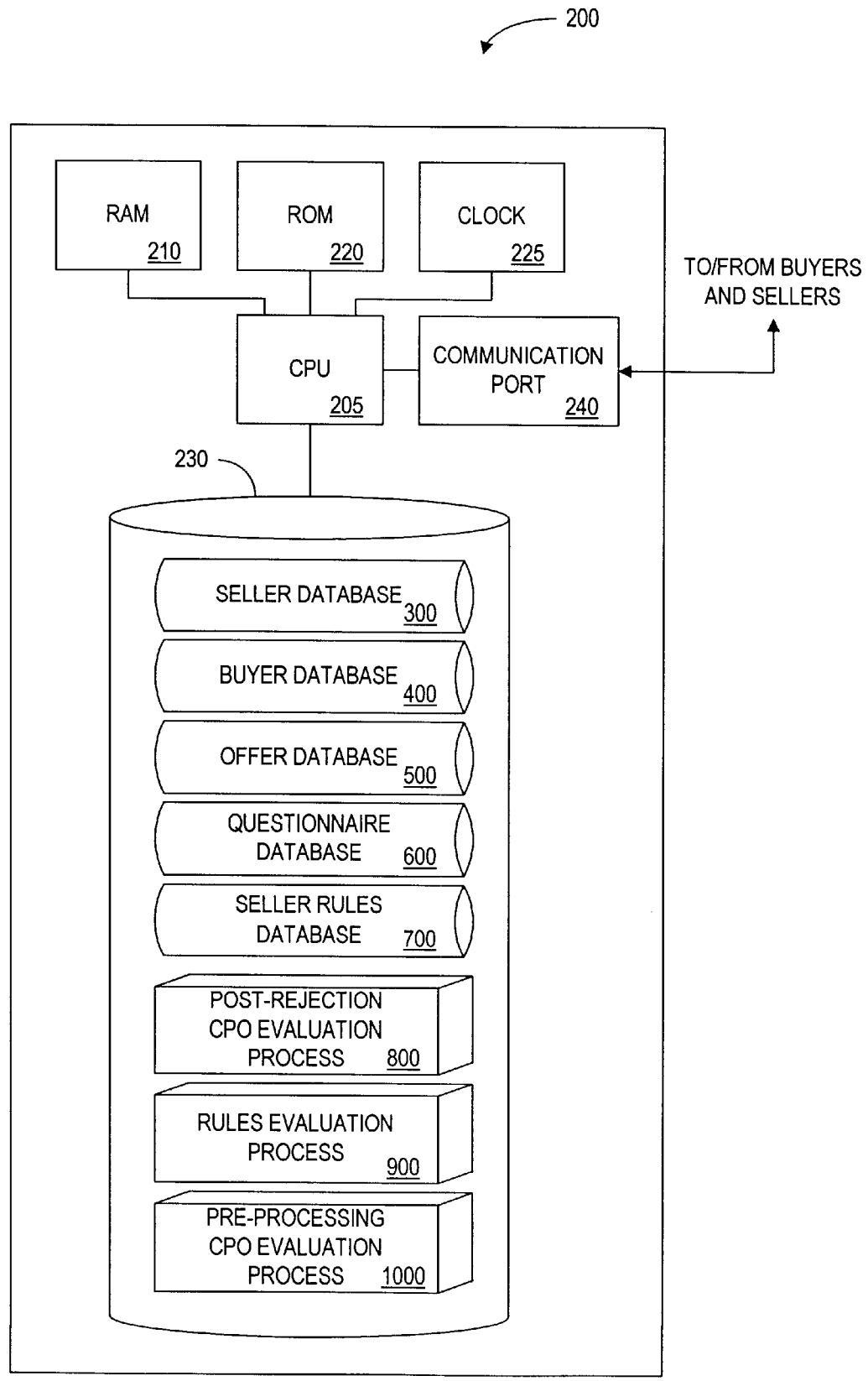
FIG. 2 is a schematic block diagram of the exemplary central controller of FIG. 1.

FIG. 2 is a block diagram showing the architecture of an illustrative central controller 200. The central controller 200 preferably includes certain standard hardware components, such as a central processing unit (CPU) 205, a random access memory (RAM) 210, a read only memory (ROM) 220, a clock 225, a data storage device 230, and a communications port 240. The CPU 205 is preferably linked to each of the other listed elements, either by means of a shared data bus, or dedicated connections, as shown in FIG. 2. The communications port 240 connects the central controller 200 to each buyer 110 and seller 130, 140, 150. The communications port 240 preferably includes multiple communication channels for simultaneously establishing a plurality of connections.

The ROM 220 and/or data storage device 230 are operable to store one or more instructions, discussed further below in conjunction with FIGS. 6A and 6B, FIGS. 7A, 7B and 7C, and FIG. 8, which the CPU 205 is operable to retrieve, interpret and execute. For example, the ROM 220 and/or data storage device 230 preferably store processes to accomplish the transfer of required payments, charges and debits, between the sellers 130, 140, 150 and buyer 110. The processing of such accounting transactions are preferably secured in a conventional manner, for example, using well-known cryptographic techniques.

The data storage device 230 includes a seller database 300, a buyer database 400, an offer database 500, a questionnaire database 600 (discussed in more detail below with respect to FIG. 4) and a seller rules database 700. The seller database 300 preferably stores information on each seller 130, 140, 150 which is registered with the CPO Management System 100 to sell goods or services to CPO buyers, including contact information. The buyer database 400 preferably stores information on each buyer of the CPO Management System 100, including identification information and billing information, such as a credit card number. The offer database 500 preferably contains a record of each CPO processed by the CPO Management System 100, including the conditions associated with the CPO and the associated status.

As previously mentioned, the seller rules database 700 set forth in FIG. 3 preferably maintains the CPO rules for one or more agency-based sellers. The seller rules database 700 maintains a plurality of records, such as records 705, 710, 715, each associated with a different CPO rule identified by rule number in field 720 and identifying the associated seller by identifier in field 730. The conditions of the original CPO which must be present in order for the rule to apply are set forth in field 740, and the conditions of the rule itself are set forth in field 750. Any additional terms and conditions that the buyer must agree to are recorded in field 760. The action item that is initiated upon satisfaction of a rule is set forth in field 770.

As also previously indicated, the data storage device 230 maintains a questionnaire database 600 that stores questions and answers of a psychographic questionnaire, and actions based upon those answers. A psychographic questionnaire is a questionnaire specifically designed to assess the buyer's needs and purchasing patterns. An example of a psychographic questionnaire 1200 to be presented to the buyer is illustrated in FIG. 5.

Referring to FIG. 4, the questionnaire database 600 maintains a plurality of records, such as records 605 to 625, each associated with a different psychographic question of the questionnaire 1200 stored in field 630 and designed to elicit a particular answer choice that is stored in field 635. The action items in field 640 are initiated upon the match of an answer choice in field 635 to its corresponding question in field 630, and include: (i) a counter-offer (record 605), (ii) a package counter-offer (records 610 and 625), (iii) a subsidy (record 615) and (iv) instant acceptance subject to a reasonableness test (record 620).

According to a first embodiment of the invention, discussed in more detail below, the questionnaire 1200 functions to elicit answers from the buyer for the purpose of making efficient counter-offer decisions after the buyer's CPO has been rejected by all sellers ("Post-Rejection CPO Evaluation Process 800"). After the submission of the buyer's CPO, the buyer is asked to participate in a survey. In one example, the survey question is "Are you a frequent leisure traveler who flies more than 5 times a year?" The possible answer choices are (A) Yes or (B) No. As set forth in record 605, the CPO Management System 100 is configured to evaluate the buyer's answer to the survey question and to counter-offer the buyer if the buyer responds "(A) Yes" and if the buyer's offer has been rejected. More specifically, record 605 is provided to counter-offer rejected frequent travelers who fly more than 5 times per year with a price equal to the buyer's offered price plus 20% of the offered price. Accordingly, the decision of whether or not to counter-offer the buyer is made efficiently and wisely because frequent travelers (such as the buyer), if pleased, are likely to use the CPO Management System 100 in the future.

Another example of a survey question according to the Post-Rejection CPO Evaluation Process 800 is "Do you have lodging accommodations planned for your trip?" Again, the possible answer choices are (A) Yes or (B) No. As set forth in record 610, the CPO Management System 100 is configured to evaluate the buyer's answer to the survey question and to package counter-offer the buyer if the buyer responds "(B) No" and if the buyer's offer is rejected. More specifically, record 610 is designed to generate a hotel/airline package counter-offer to rejected buyers who do not yet have lodging accommodations for their trips. Once again, the decision of who and what to counter-offer is made efficiently and wisely because travelers (such as the buyer) who do not yet have lodging arrangements are more likely than not to accept a package counter-offer including a lodging component. This process also eliminates a wasted hotel/airline package counter-offer to travelers who do not require a hotel.

According to a second embodiment of the invention, discussed in more detail below, the questionnaire 1200 functions to elicit answers for the purpose of making intelligent counter-offer decisions before a CPO is evaluated to determine if it is acceptable by one of a plurality of sellers ("Pre-Processing CPO Evaluation Process 1000"). During or after the submission of a buyer's CPO, the buyer is asked to participate in a survey. In one example, the survey question is "If we are unable to find you tickets at your price for this trip, what will you do?" The possible answer choices are (A) Drive, (B) Not go, (C) Buy tickets directly from a major airline, or (D) Buy tickets from another on-line travel service. As set forth in record 615, the CPO Management System 100 is configured to evaluate the buyer's offer and to subsidize the buyer if the buyer responds "(C) Buy tickets directly from a major airline" and if the buyer's offer is considered to be too low for acceptance. More specifically, record 615 is designed to subsidize the buyer preprocessing, with whatever amount necessary to make the offer acceptable if the buyer indicates that he will alternatively buy tickets directly from a major airline. As previously described, the gain in market share from the buyer may be worth the cost of the subsidy. It should be noted that other actions may be required for discriminatory subsidization, such as determining whether or not there is enough money in a subsidy budget to apply to a given offer or determining whether the subsidy amount exceeds a threshold dollar amount (e.g., $50/offer).

In another example of the Pre-Processing CPO Evaluation Process 1000, the questionnaire 1200 functions to elicit answers for the purpose of making efficient instantaneous acceptance or rejection decisions. Here, the survey question is once again "If we are unable to find you tickets at your price for this trip, what will you do?" The answer choices are (A) Drive, (B) Not go, (C) Buy tickets directly from a major airline, or (D) Buy from another on-line travel service. As set forth in record 620, the CPO Management System 100 is configured to evaluate and instantly accept low offers from buyers who answer "(D) Buy from another on-line travel service," provided that the buyer submits an offer determined to be reasonable based on an instantly available statistical or historical analysis. More specifically, record 620 is designed to perform a reasonableness test and to instantly accept a buyer's offer if it is reasonable and if the buyer indicates he will purchase tickets from another on-line travel service if his offer is rejected. The reasonableness test may consist of, e.g., the system determining if the buyer's offer at least exceeds a statistically or historically determined threshold amount for the particular conditions of the offer. Once again, the gain in market share from the buyer may be worth the acceptance of a low, but reasonable, offer.

In yet another example of the Pre-Processing CPO Evaluation Process 1000, the questionnaire 1200 functions to elicit answers for the purpose of the CPO Management System 100 making efficient package counter-offer decisions. The survey question is "Do you need hotel accommodations for your stay in your destination city?" The possible answer choices are (A) Yes or (B) No. The CPO Management System 100 is configured to evaluate the buyer's offer and to counter-offer a hotel as a component of a package counter-offer if the buyer responds "(A) Yes." More specifically, record 625 is designed to provide counter-offer to buyers who affirmatively express necessity for such accommodations. As previously described, the package counter-offer is customized to that particular buyer so as to not waste any opportunities to make the buyer's low offer acceptable or to sell additional products.

Alternate embodiments of psychographic question/answer choices include those that trigger actions based on the conditions of a buyer's CPO or those that are age-based, e.g., the system may assume that a 22 year-old traveler is more flexible than an older traveler and is therefore more apt to change his destination airport so long as it is still in the same city.

The data storage device 230 also includes the Post-Rejection CPO Evaluation Process 800, the Pre-Processing CPO Evaluation Process 1000 and a Rules Evaluation Process 900, discussed further below in conjunction with FIGS. 6A and 6B, FIGS. 7A, 7B and 7C, and FIG. 8. Generally, both CPO Evaluation Processes 800 and 1000 (i) receive a CPO from a buyer 110, (ii) provide the questions and answers set forth in the questionnaire 1200 to the buyer, (iii) provide the CPO to the appropriate broadcast-based sellers 140, 150 and evaluate each CPO against the appropriate rules of each agency-based seller 130, and (iv) determine whether any sellers 130, 140, 150 accept the CPO. The Rules Evaluation Process 900 is a subroutine executed by the CPO Evaluation Processes 800 and 1000, which receives a CPO and compares the CPO against the rules of one or more agency-based sellers to generate a response on behalf of the sellers to the given CPO.

As previously described, the Post-Rejection CPO Evaluation Process 800 compares the buyer's answer choices with those in field 635 of the questionnaire database 600 after the buyer's original offer has been rejected. If the buyer's answer choice(s) "match" one or more records, i.e., correspond to the answer choice(s) in field 635 for a given question in field 630, the counter-offer, subsidy or instant acceptance action in field 640 of that record may be triggered. In the Pre-Processing CPO Evaluation Process 1000, the same comparison generally described above is performed, but before the buyer's offer is transmitted to the sellers for consideration.

Post-Rejection CPO Evaluation Process Embodiment

Figure 6A:
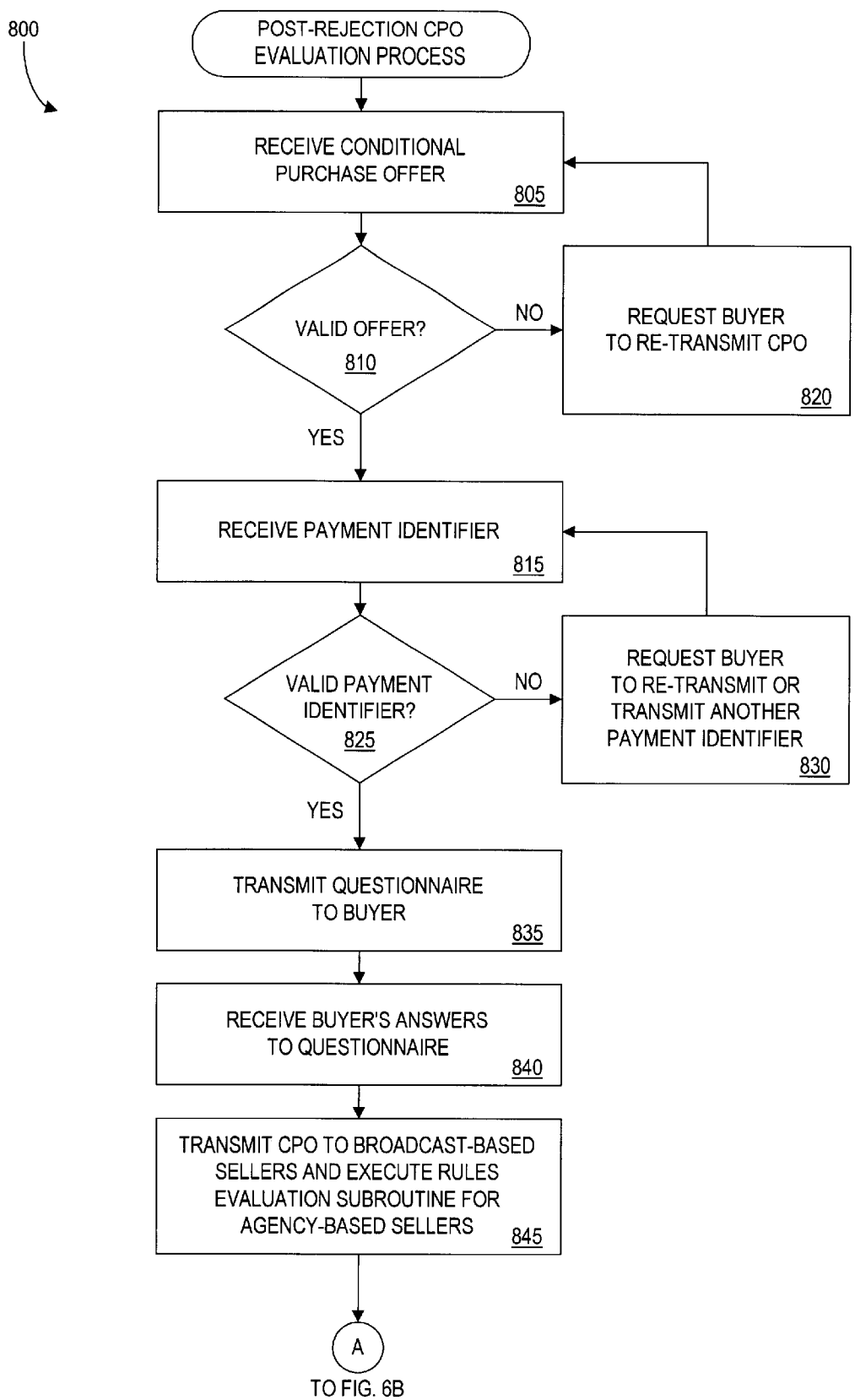
FIGS. 6A and 6B are flow diagrams depicting a CPO Evaluation Process according to a first embodiment of the present invention.
Figure 6B:
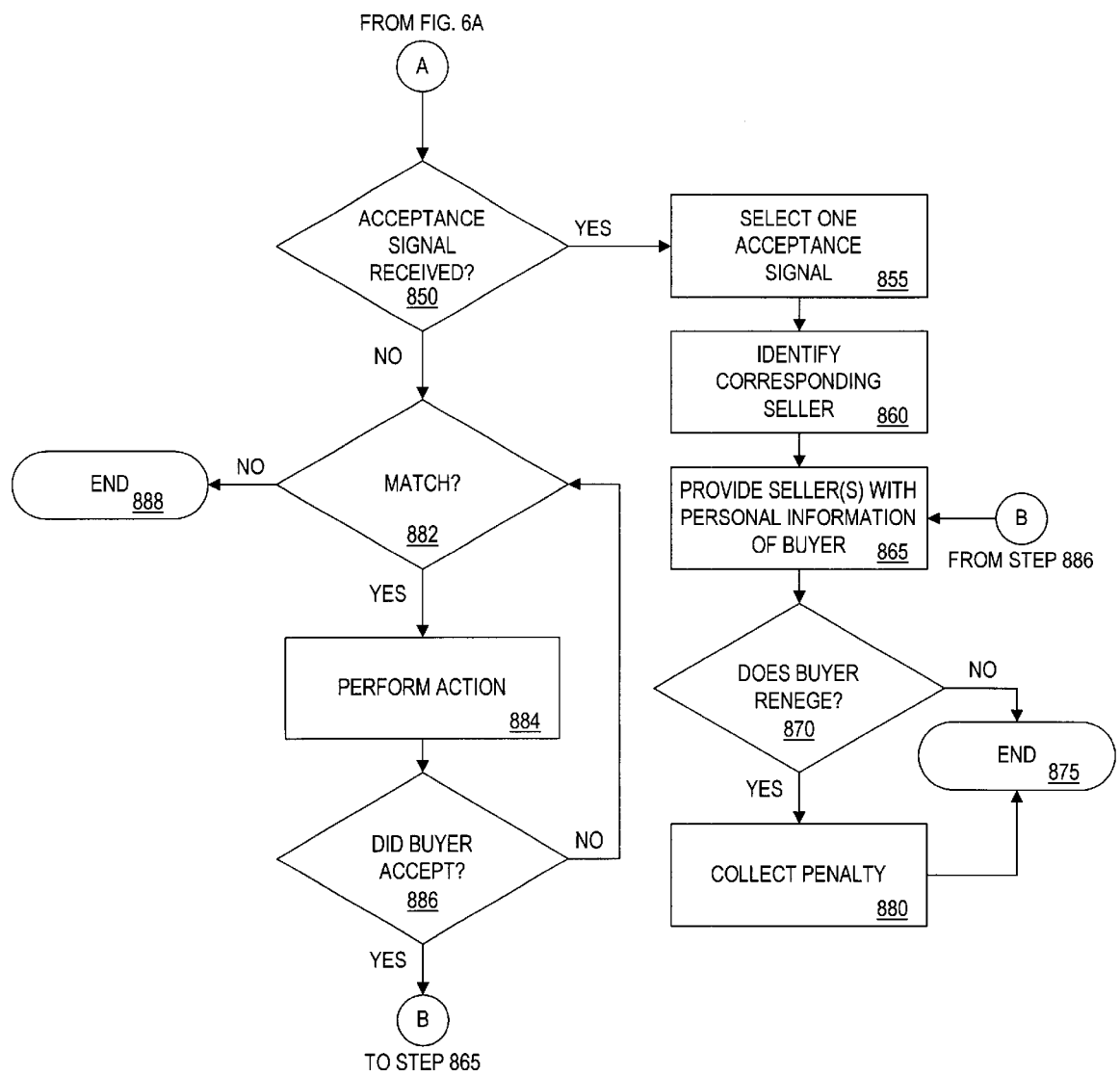

The Post-Rejection CPO Evaluation Process 800 described above will now be described in detail with reference to FIGS. 6A and 6B. The Post-Rejection CPO Evaluation Process 800 begins at step 805 of FIG. 6A, where a CPO is received from the buyer for an identified good or service. The CPO is evaluated in step 810 to determine whether or not it is a valid offer, and, in step 820, if it is determined that the CPO is not valid, the buyer is requested to re-transmit the CPO.

The CPO may optionally be a Binding CPO, wherein authorization is obtained with the buyer offer to bind the buyer if and when the offer is accepted by a seller. In a Binding CPO, there are typically no provisions for a Buyer to renege. The present invention is described with respect to a non-binding CPO, wherein a buyer may renege after a seller acceptance. In the described embodiment, a penalty may be assessed against a buyer who reneges after an acceptance by a seller.

The CPO may also contain a seller-defined variable or flexible condition, typically specified using a range. For example, the variable condition may be a date range within which the product may be delivered by the seller. Other variable conditions might include: a price range, a performance range, a quality range, etc. The seller may then choose a product to fill the buyer's flexible condition within the specified range. Such a variable condition may provide substantial assistance to the seller in filling the buyer's CPO. For example, with respect to an airline ticket, the seller may be able to be meet a buyer's specified price if the CPO permits him to select a flight within a range of times or days.

In step 815, when a valid CPO is received, a payment identifier of a General Purpose Account, such as a credit or debit card account from which funds may be paid, is received. The General Purpose Account is used with a Binding CPO to guarantee payment of the goods or services if a seller accepts the CPO. In the described non-binding CPO, the General Purpose Account may be used to guarantee payment of a fee or penalty if the buyer reneges on its promise to purchase the goods or services. Thus, in step 825, the payment identifier is evaluated to determine whether or not it is a valid payment identifier. For example, the system may query a remote authorization server to verify that sufficient funds are available in the General Purpose Account to cover the buyer's CPO offer price. In step 830, if it is determined that the payment identifier is invalid, the buyer is requested to either re-transmit the payment identifier or to transmit another payment identifier.

When a payment identifier has been found to be acceptable, the questionnaire 1200 set forth in FIG. 5 is transmitted to the buyer in step 835. After the buyer has had an opportunity to select answers to each of the questions, the buyer reports the answers back to the CPO Management System 100. Such reporting can be performed by telephone, facsimile, e-mail, over the Internet, etc. The buyer's answers are received by the CPO Management System 100 in step 840.

In step 845, the CPO is transmitted to broadcast-based sellers and the Rules Evaluation Process 900 is executed on behalf of agency-based sellers. The Rules Evaluation Process 900, discussed in detail below in conjunction with FIG. 8, evaluates whether or not the buyer's CPO is accepted as in conformance with CPO Rules provided by an Agency-Based Seller. In step 850, it is determined if an acceptance signal thus results from Rules Evaluation Process 900, and/or is received from a broadcast-based seller. If so, one acceptance signal is selected in step 855. The seller corresponding to the acceptance signal is identified by reference to its seller identifier in the seller database 400 in step 860, and in step 865, the seller(s) are then provided with the buyer's personal information as set forth in the buyer database 500, such as the buyer's name, address and payment identifier.

In step 870, it is determined whether or not the buyer has reneged on its offer to purchase the goods or services described in the CPO. If the buyer has followed through with its purchase, the CPO Post-Rejection Evaluation Process 800 ends at step 875. If the buyer has reneged, a penalty is collected from the buyer in step 880 by the payment method corresponding to the payment identifier described above. The Post-Rejection CPO Evaluation Process 800 then terminates in step 875.

If in step 850 it is determined that the CPO has not been accepted by at least one agency or broadcast-based seller after the predetermined period of time, the answers to the questionnaire 1200 are evaluated against the questionnaire database 600 in step 882. Here, the buyer's question and answer choices are compared with the question and answer choice fields 630 and 635, respectively, in order from record 605 to record 610 (i.e., the records relevant to the Post-Rejection CPO Evaluation Process 800) to determine whether or not there is a match. If a match in question and answer choice is found, the record in the questionnaire database 600 is retrieved and the action set forth in field 640 corresponding to the pulled record is executed in step 884. It is noted that the actions in records 605 and 610 both include counter-offers.

In step 886, a test is performed to determine whether or not the buyer has accepted the counter-offer. If it is determined that the buyer did not accept the counter-offer, step 882 is repeated until review of all of the records have been exhausted. Once it is determined that there are no more actions to be taken, the CPO Post-Rejection Evaluation Process 800 ends in step 888. If, on the other hand, in step 886 it is determined that the buyer did accept the counter-offer, the Post-Rejection CPO evaluation Process 800 continues at step 865, described above.

In the described embodiment, a proposed counter-offer accepted by a buyer is automatically accepted by the CPO Management System. In an alternate embodiment, a counter-offer accepted by a buyer may subsequently be resubmitted to both agency and broad-case based sellers to determine if there is a seller acceptance.

Pre-Processing CPO Evaluation Process Embodiment

Figure 7A:
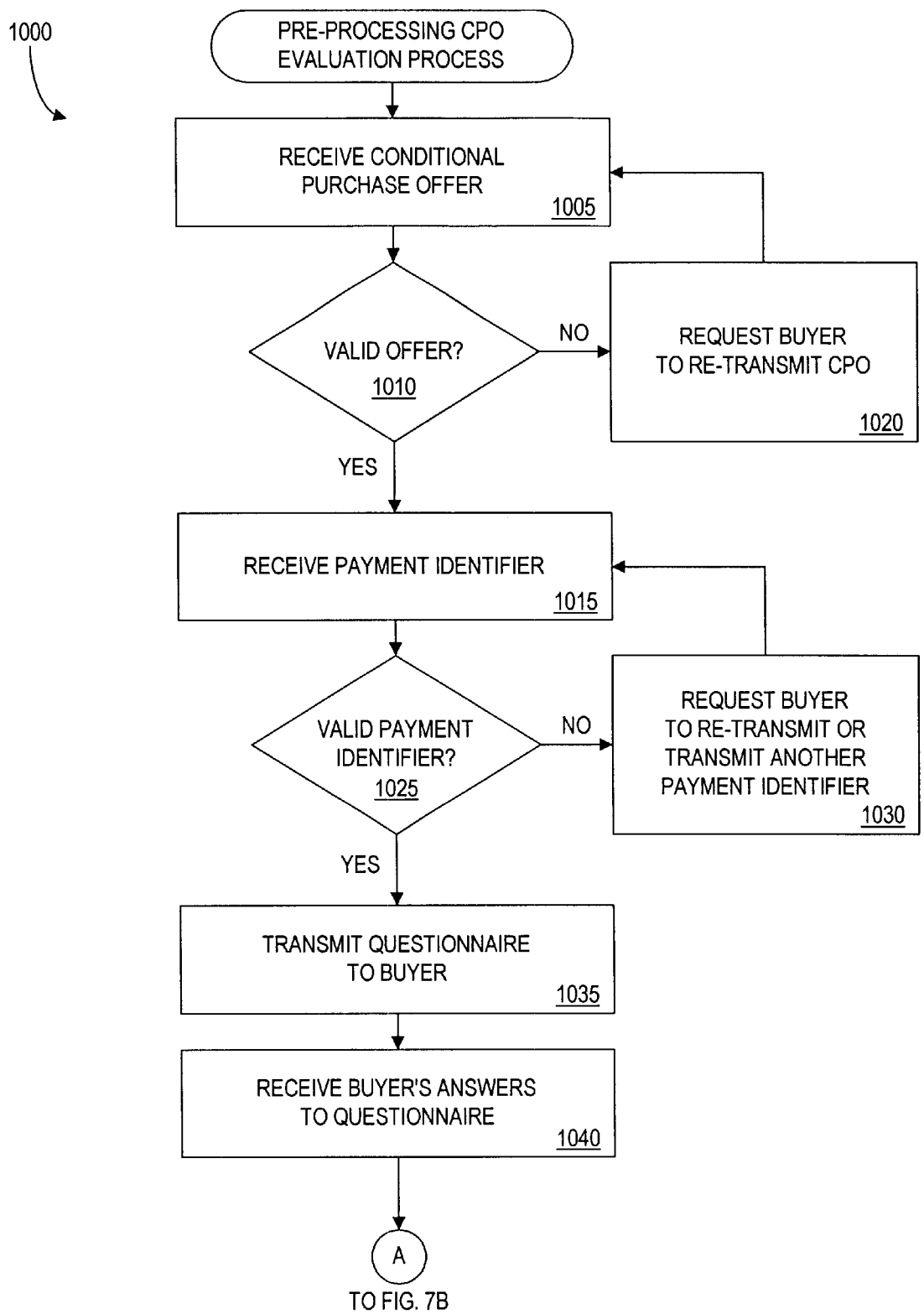
FIGS. 7A through 7C are flow diagrams depicting a CPO Evaluation Process according to a second embodiment of the present invention.
Figure 7B:
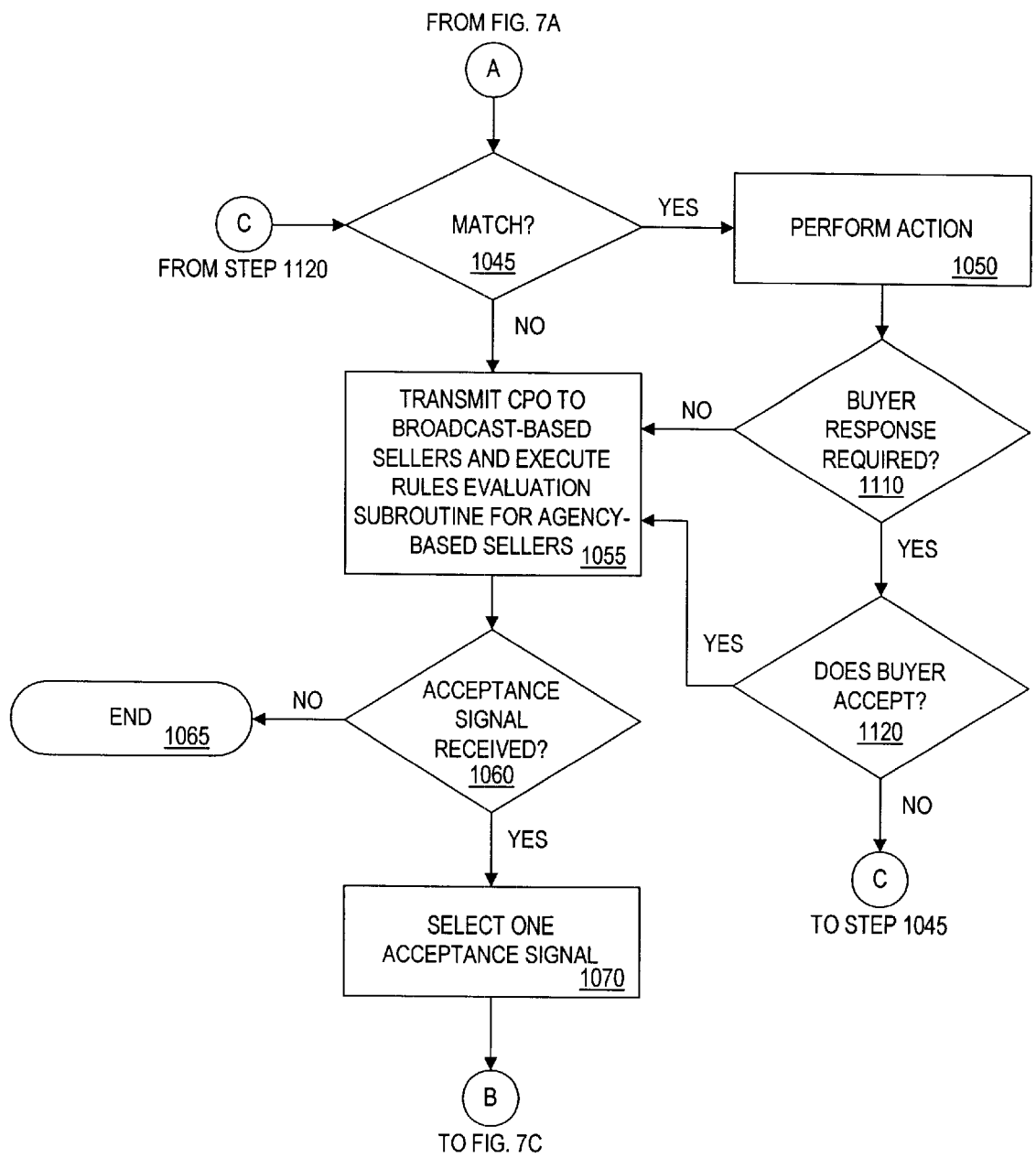
Figure 7C:
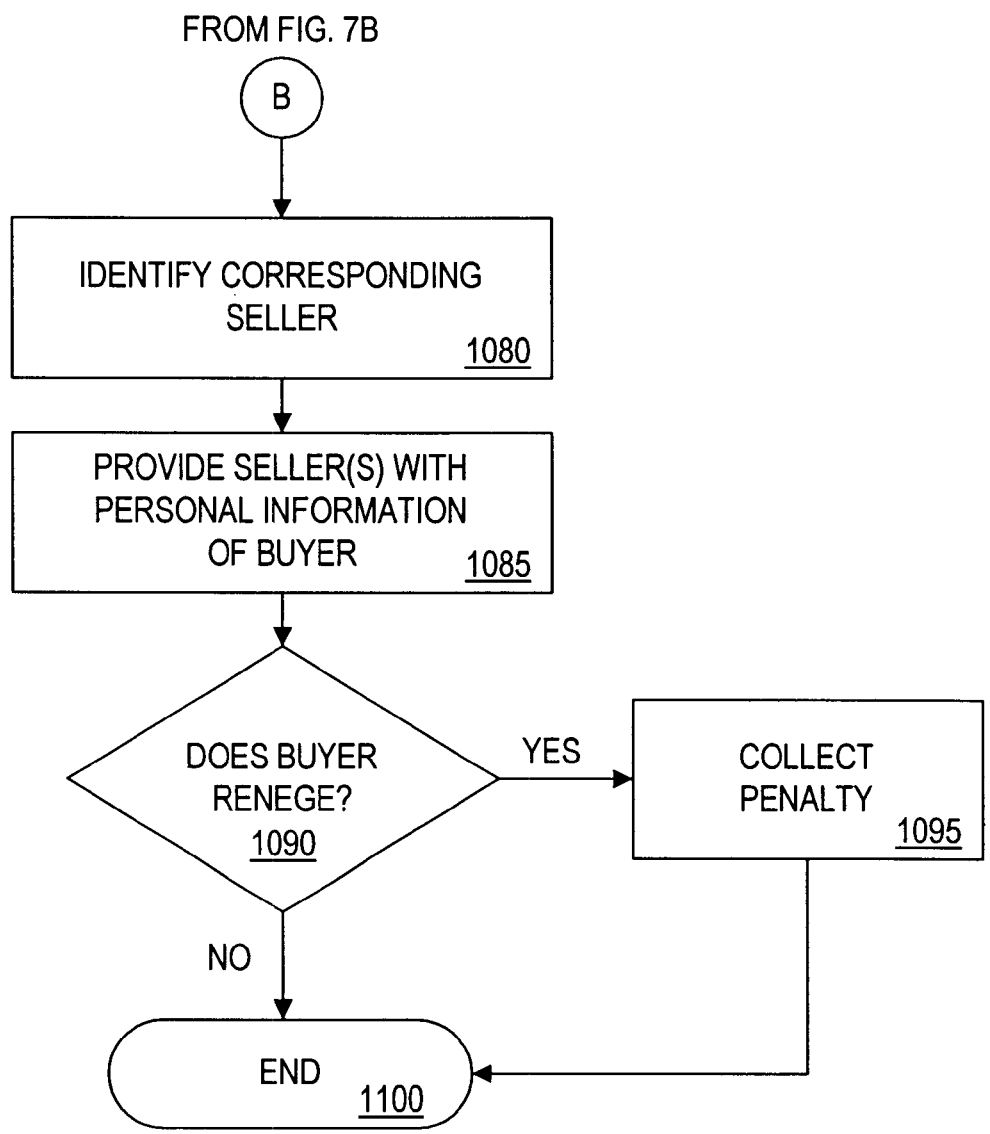

The Pre-Processing CPO Evaluation Process 1000 described above will now be described in detail with reference to FIGS. 7A, 7B and 7C. The Pre-Processing CPO Evaluation Process 1000 begins at step 1005 of FIG. 7A, where a CPO is received from the buyer for an identified good or service. The CPO is evaluated in step 1010 to determine whether or not it is a valid offer, and, in step 1020, if it is determined that the CPO is not valid, the buyer is requested to re-transmit the CPO.

As with the Post-Rejection CPO Evaluation Process 800 described above, the CPO may optionally be a Binding CPO, or a non-binding CPO as described herein.

In step 1015, when a valid CPO is received, a payment identifier of a General Purpose Account, such as a credit or debit card account from which finds may be paid, is received. The payment identifier guarantees payment of the goods or services if a seller accepts the CPO or the payment of a fee or penalty if the buyer reneges on its promise to purchase the goods or services. Thus, in step 1025, the payment identifier is evaluated to determine whether or not it is a valid payment identifier. As described above, the system may query a remote authorization server to verify that sufficient funds are available in the General Purpose Account to cover the buyer's CPO. In step 1030, if it is determined that the payment identifier is invalid, the buyer is requested to re-transmit the payment identifier or to transmit another payment identifier.

When a payment identifier has been found to be acceptable, the questionnaire 1200 set forth in FIG. 5 is transmitted to the buyer in step 1035. After the buyer has had an opportunity to select its answers to each of the questions, the buyer reports the answers back to the CPO Management System 100. Once again, such reporting can be performed by telephone, facsimile, e-mail, over the Internet, etc. The buyer's answers are received by the CPO Management System 100 in step 1040.

The answers to the questionnaire 1200 are evaluated against the questionnaire database 1000 in step 1045 by comparing the buyer's question and answer choices with the question and answer choice fields 630 and 635, respectively, in order from record 615 to record 620 to record 625 (i.e., the records relevant to the Pre-Processing CPO Evaluation Process 1000) to determine whether or not there is a match.

If there is no match in step 1045, the original CPO is transmitted to broadcast-based sellers and the Rules Evaluation Process 900 is executed on behalf of agency-based sellers in step 1055. The Rules Evaluation Process 900 is discussed below in conjunction with FIG. 8. It is then determined whether or not the CPO has been accepted by at least one agency or broadcast-based seller in step 1060, by determining whether or not at least one acceptance signal either results from the Rules Evaluation Process, and/or has been received from a broadcast-based seller over a predetermined period of time. If so, one acceptance signal is selected in step 1070. The seller corresponding to the acceptance signal is identified by reference to its seller identifier in the seller database 400 in step 1080, and in step 1085 the seller(s) are then transmitted the buyer's personal information as set forth in the buyer database 500, such as the buyer's name, address and payment identifier. If an acceptance signal is not received, the Pre-Processing CPO Evaluation Process 1000 ends in step 1065.

In step 1090, it is determined whether or not the buyer has reneged on its offer to purchase the goods or services described in the CPO. If the buyer has followed through with the purchase, the Pre-Processing CPO Evaluation Process 1000 ends at step 1100. If the buyer has reneged, in step 1095 a penalty is collected from the buyer by the payment method corresponding to the payment identifier described above. The Pre-Processing CPO Evaluation Process 1000 then terminates in step 1100.

If a match in question and answer choice is found in step 1045, the record in the questionnaire database 600 is pulled and the action set forth in field 640 corresponding to that record is executed in step 1050. In step 1110, it is determined whether or not the executed action requires a response from the buyer. For example, the action set forth in field 640 of record 625 involves a package counter-offer which requires an acceptance or a rejection from the buyer in step 1120. If for such an action it is determined that the buyer does not accept, step 1045 is repeated until a review of all of the relevant records have been exhausted. If the buyer does accept, the terms of the counter-offer, which have been proposed to and accepted by the buyer, are transmitted to broadcast-based sellers and the Rules Evaluation Process 900 is executed on behalf of agency-based sellers in step 1055.

If a buyer response is determined to not be required in step 1110, such as with the application of the subsidy of record 615, the terms of the subsidized offer is transmitted to broadcast-based sellers, and the Rules Evaluation Process 900 is executed on behalf of agency-based sellers in step 1055. In other embodiments, such as that set out in record 620, there is an instant acceptance of the revised offer by the CPO Management System.

Figure 8:
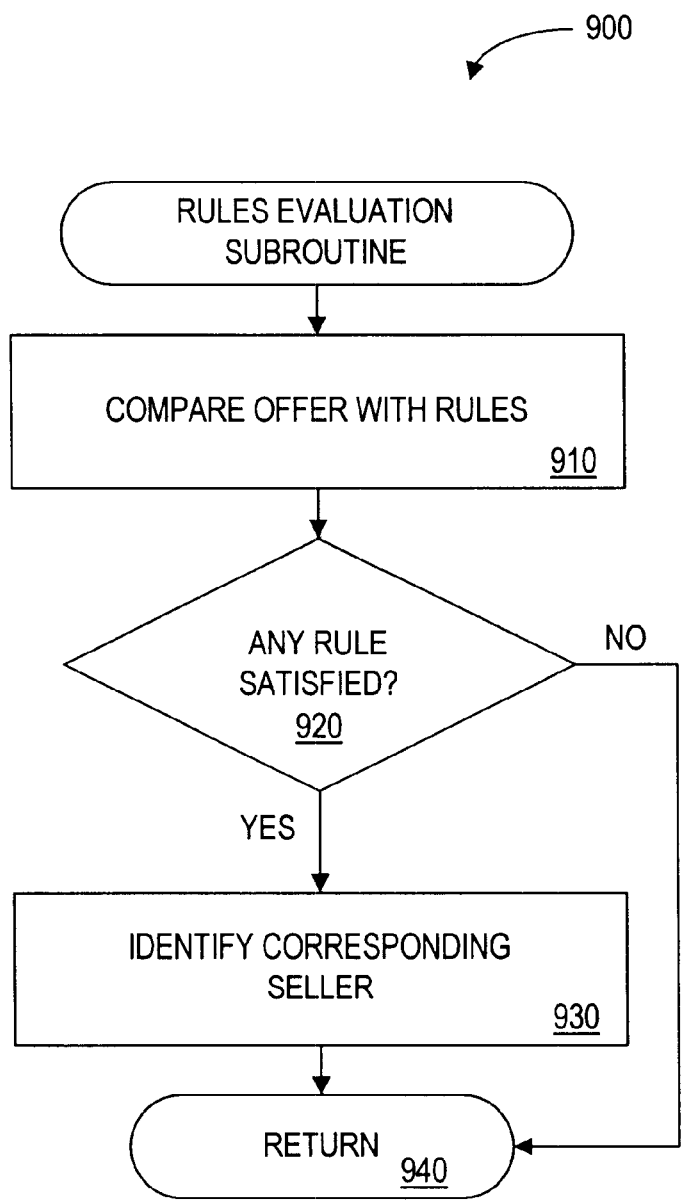
FIG. 8 is a flow diagram depicting a Rules Evaluation Process in accordance with the present invention.

As previously indicated, both CPO Evaluation Processes 800 and 1000 execute a Rules Evaluation Process 900 during steps 840 and 1055, respectively, to determine if one or more agency-based sellers are willing to accept a given CPO. As shown in FIG. 8, the Rules Evaluation Process 900 compares the conditions associated with the CPO during step 910 with the corresponding restrictions set forth in any CPO rules defined by any agency-based sellers. A test is then performed during step 920 to determine if any CPO rule is satisfied. If it is determined during step 920 that no CPO rule is satisfied, then program control terminates during step 940. If, however, it is determined during step 920 that a CPO rule is satisfied, an acceptance signal may be generated as necessary, and the corresponding seller is identified during step 930, before program control terminates during step 940.

It is desirable that in one embodiment the present invention include features that prevent buyers from repetitively querying, or 'pinging,' the system, to determine the underlying price flexibility of the sellers. Such pinging might result in potential damage to the seller's price margins and profitability. As mentioned above, requiring the buyer 110 to enter into a Binding CPO at least discourages pinging by insuring that if an offer is accepted, the product is actually purchased. Another method of discouraging pinging includes preventing buyers from submitting repetitive, similar offers. For example, repetitive CPOs changing only the offer price in an effort to determine price flexibility may be blocked by the system. In one embodiment, subsequent CPOs by the same buyer 110 are accepted by the CPO Management System 100 only if there is some substantial change to the buyer specifications that would result in the purchase of an essentially different product. For example, with respect to the sale of airline tickets, subsequent CPOs may be accepted for processing only if there is a significant change in the itinerary. Yet another method for discouraging pinging is to require a payment for each submission of a CPO.

It is also desirable that in another embodiment of the invention, sellers' identities are maintained anonymous within the CPO Management System 100 until a CPO is accepted. Such identity anonymity, by itself and in combination with the discouragement of price pinging discussed herein, enables sellers to participate in the CPO Management System 100 process without fear of undercutting their published price structures and losing their regular customer base. For example, most sellers have published product prices, and loyal customers who willingly pay those prices. Participating in the CPO Management System 100 enables these sellers to discount those products, potentially below their published prices, to fill offers from buyers who might not otherwise pay published prices. With anonymity, these sellers can more freely participate in the CPO Management System 100 process with less fear of losing their regular customers and undercutting their published price structure.

It is to be understood that the embodiments and variations shown and described herein are merely illustrative of the principle of this invention and that various modifications may be implemented by those skilled in the art without departing from the scope and spirit of the invention.

What is claimed is:

1. A method for processing a sale of an item, comprising the steps of:

obtaining a first conditional purchase offer for said item from a customer, said first conditional purchase offer containing at least a description of said item, a payment identifier for specifying a manner in which funds may be paid and a price;

providing a questionnaire having a first question and a first and a second answer to said customer;

receiving one of said first and second answers from said customer;

performing a predetermined action based upon said received answer; and generating a second conditional purchase offer including at least said item based on said predetermined action.

2. The method according to claim 1 and further comprising the step of providing said second conditional purchase offer to a plurality of potential sellers.

3. The method according to claim 2, further comprising the step of receiving from one or more of said sellers an acceptance of said second conditional purchase offer.

4. The method according to claim 3, further comprising the step of binding said customer to purchase at least said item upon receipt of said acceptance.

5. The method according to claim 1, wherein said predetermined action is selected from the group consisting of: generating a package to offer to said customer, said package containing said item specified by said first conditional purchase offer and one or more additional items, subsidizing the price of said first conditional purchase offer, or acceptance of said first conditional purchase offer.

6. The method according to claim 1, wherein the step of performing said predetermined action comprises the steps of:

assembling a package including said item and one or more additional items;

offering said package to said customer; and receiving an acceptance or a rejection signal from said customer;

wherein said second conditional purchase offer is the same as the first conditional purchase offer if said rejection signal is received.

7. The method according to claim 6, wherein said package is offered to said customer at a single price.

8. The method according to claim 6, wherein said additional items are complimentary to said item specified in said first conditional purchase offer.

9. The method according to claim 1, wherein the step of performing said predetermined action comprises the steps of:

evaluating said price of said first conditional purchase offer to determine whether it is reasonable; and sending an acceptance signal to said customer if said price of said first conditional purchase offer is reasonable.

10. The method according to claim 9, wherein the step of evaluating said price of said first conditional purchase offer comprises the step of determining whether said price at least exceeds a statistically or historically determined threshold amount.

11. The method according to claim 1, wherein the step of performing said predetermined action comprises the steps of:

obtaining a subsidy to increase said price;

allocating said subsidy to said price of said first conditional purchase offer to establish a second price, wherein said second conditional purchase offer comprises said second price.

12. The method according to claim 11, wherein said step of obtaining said subsidy includes the step of determining whether a sufficient amount of money exists in a subsidy budget before said step of allocating said subsidy.

13. The method according to claim 1, further comprising the step of initiating the use of said payment identifier to collect said funds.

14. The method according to claim 1, wherein said funds are paid from a General Purpose Account.

15. The method according to claim 1, wherein said first conditional purchase offer further contains a variable condition.

16. The method according to claim 15, wherein said variable condition is selected from the group consisting of a price range, a performance range or a quality range.

17. The method according to claim 1, further comprising the steps of:

determining whether said first conditional purchase offer has been previously submitted by said customer before said step of providing said questionnaire; and rejecting said first conditional purchase offer if said first conditional purchase offer has been previously submitted by said customer.

18. The method of claim 1, wherein said sellers are anonymous to said customer.

19. A method for processing a sale of an item, comprising the steps of:

obtaining a first conditional purchase offer for said item from a customer, said first conditional purchase offer containing at least a description of said item, a payment identifier for specifying a manner in which funds may be paid and a price;

providing a questionnaire having a first question and a first and a second answer to said customer;

receiving one of said first and second answers from said customer;

providing said first conditional purchase offer to a plurality of potential sellers;

determining whether one or more of said sellers have accepted said first conditional purchase offer, and if one or more sellers have not accepted said first conditional purchase offer:

performing a predetermined action based upon said received answer; and generating a second conditional purchase offer including at least said item based on said predetermined action.

20. The method according to claim 19 and further including the step of providing said second conditional purchase offer to said plurality of potential sellers.

21. The method according to claim 20, further comprising the step of receiving from one or more of said sellers an acceptance of said second conditional purchase offer.

22. The method according to claim 21, further comprising the step of binding said customer to purchase at least said item upon receipt of said acceptance of said second conditional purchase offer.

23. The method according to claim 19, wherein said predetermined action is selected from the group consisting of: generating a package to offer to said customer, said package containing said item specified by said first conditional purchase offer and one or more additional items, subsidizing the price of said first conditional purchase offer, or acceptance of said first conditional purchase offer.

24. The method according to claim 19, wherein the step of performing said predetermined action comprises the steps of:
    assembling a package including said item and one or more additional items;
    offering said package to said customer; and
    receiving an acceptance or a rejection signal from said customer;
    wherein said second conditional purchase offer is the same as said first conditional purchase offer if said rejection signal is received.

25. The method according to claim 24, wherein said package is offered to said customer at a single price.

26. The method according to claim 24, wherein said additional items are complimentary to said item specified in said first conditional purchase offer.

27. The method according to claim 19, wherein the step of performing said predetermined action comprises the steps of:
    evaluating said price of said second conditional purchase offer to determine whether it is reasonable; and
    sending an acceptance signal to said customer if said price of said second conditional purchase offer is reasonable.

28. The method according to claim 27, wherein the step of evaluating said price of said second conditional purchase offer comprises the step of determining whether said price at least exceeds a statistically or historically determined threshold amount.

29. The method according to claim 19, wherein the step of performing said predetermined action comprises the steps of:
    obtaining a subsidy to increase said price; and
    allocating said subsidy to said price of said first conditional purchase offer to establish a second price, wherein said second conditional purchase offer comprises said second price.

30. The method according to claim 29, wherein said step of obtaining said subsidy includes the step of determining whether a sufficient amount of money exists in a subsidy budget before said step of allocating said subsidy.

31. The method according to claim 19, further comprising the step of initiating the use of said payment identifier to collect said funds.

32. The method according to claim 19, wherein said funds are paid from a General Purpose Account.

33. The method according to claim 19, wherein said first conditional purchase offer further contains a variable condition.

34. The method according to claim 33, wherein said variable condition is selected from the group consisting of: a price range, a performance range or a quality range.

35. The method according to claim 19, further comprising the steps of:
    determining whether said first conditional purchase offer has been previously submitted by said customer before said step of providing said questionnaire; and
    rejecting said first conditional purchase offer if said first conditional purchase offer has been previously submitted by said customer.

36. The method of claim 19, wherein said sellers are anonymous to said customer.

37. A system for processing a sale of an item, comprising:
    one or more communications ports configured to obtain a first conditional purchase offer for said item from a customer, said first conditional purchase offer containing at least a description of said item, a payment identifier for specifying a manner in which funds may be paid and a price, said ports further configured to provide a questionnaire having a first question and a first and a second answer to said customer and to receive one of said first and second answers from said customer; and
    one or more processors to perform a predetermined action based upon said received answer and to provide a second conditional purchase offer including at least said item to a plurality of potential sellers.

38. The system according to claim 37, wherein said processors are further configured to assemble a package including said item and one or more additional items, offer said package to said customer, and receive an acceptance or a rejection signal from said customer.

39. The system according to claim 37, wherein said processors are further configured to evaluate said price of said first conditional purchase offer to determine whether it is reasonable, and to send an acceptance signal to said customer if said first conditional purchase offer is reasonable.

40. The system according to claim 37, wherein said processors are further configured to obtain a subsidy to increase said price, allocate said subsidy to said price of said first conditional purchase offer to establish a second price, wherein said second conditional purchase offer comprises said second price.

41. A system for processing a sale of an item, comprising:
    one or more communications ports configured to obtain a first conditional purchase offer for said item from a customer, said first conditional purchase offer containing at least a description of said item, a payment identifier for specifying a manner in which funds may be paid and a price, said ports further configured to provide a questionnaire having a first question and a first and a second answer to said customer and to receive one of said first and second answers from said customer; and
    one or more processors to provide said first conditional purchase offer to a plurality of potential sellers, determine whether one or more of said sellers have accepted said first conditional purchase offer, and if one or more sellers have not accepted said first conditional purchase offer, to perform a predetermined action based upon said received answer, and to provide a second conditional purchase offer including at least said item to said sellers.

42. The system according to claim 41, wherein said processors are further configured to assemble a package including said item and one or more additional items, offer said package to said customer, and receive an acceptance or a rejection signal from said customer.

43. The system according to claim 41, wherein said processors are further configured to evaluate said price of said first conditional purchase offer to determine whether it is reasonable, and to send an acceptance signal to said customer if said first conditional purchase offer is reasonable.

44. The system according to claim 41, wherein said processors are further configured to obtain a subsidy to increase said price, allocate said subsidy to said price of said first conditional purchase offer to establish a second price, wherein said second conditional purchase offer comprises said second price.

45. The method according to claim 2 wherein said step of providing said second conditional purchase offer to a plurality of potential sellers includes at least one of:

provided said second conditional purchase offer to a plurality of broadcast-based sellers; and comparing said second conditional purchase offer to a plurality of conditional purchase offer rules provided by agency-based sellers.

46. The method according to claim 20 wherein said step of providing said first conditional purchase offer to a plurality of potential sellers and said step of providing said second conditional purchase offer to a plurality of potential sellers each includes at least one of:

providing said second conditional purchase offer to a plurality of broadcast-based sellers; and comparing said second conditional purchase offer to a plurality of conditional purchase offer rules provided by agency-based sellers.

* * * * *